United States Patent
Tan

(10) Patent No.: US 11,334,732 B2
(45) Date of Patent: May 17, 2022

(54) SYSTEMS AND APPROACHES FOR REDUCING POWER CONSUMPTION IN INDUSTRIAL DIGITAL BARCODE SCANNERS

(71) Applicant: Zebra Technologies Corporation, Lincolnshire, IL (US)

(72) Inventor: Chinh Tan, East Setauket, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/218,101

(22) Filed: Dec. 12, 2018

(65) Prior Publication Data
US 2020/0193105 A1    Jun. 18, 2020

(51) Int. Cl.
G06K 9/22 (2006.01)
G06K 7/10 (2006.01)
H04N 1/028 (2006.01)
H04N 1/00 (2006.01)

(52) U.S. Cl.
CPC ..... *G06K 7/10732* (2013.01); *G06K 7/10801* (2013.01); *G06K 7/10881* (2013.01); *H04N 1/00816* (2013.01); *H04N 1/02815* (2013.01)

(58) Field of Classification Search
CPC ........... G06K 7/10564; G06K 7/10574; G06K 7/10584; G06K 7/10742; G06K 7/10752
USPC ...................... 235/462.42, 462.45
See application file for complete search history.

(56) References Cited

U.S. PATENT DOCUMENTS

| | | | | |
|---|---|---|---|---|
| 5,543,889 | A * | 8/1996 | McIntyre | G02B 27/20 396/431 |
| 6,181,378 | B1 * | 1/2001 | Horie | H04N 1/00204 348/345 |
| 9,646,188 | B1 * | 5/2017 | Kuchenbrod | G06K 7/10801 |
| 9,800,749 | B1 * | 10/2017 | Tan | H04N 1/00816 |
| 2007/0102520 | A1 * | 5/2007 | Carlson | H04N 5/3454 235/454 |
| 2007/0164115 | A1 * | 7/2007 | Joseph | G06K 7/10722 235/462.21 |
| 2017/0343345 | A1 * | 11/2017 | Wittenberg | G01C 3/08 |

* cited by examiner

*Primary Examiner* — Daniel St. Cyr
(74) *Attorney, Agent, or Firm* — Yuri Astvatsaturov

(57) ABSTRACT

An imaging assembly for capturing at least one object appearing in a field of view (FOV) is provided that includes an image capturing system, a controller operatively coupled to the image capturing system to control operation thereof, and a processor operatively coupled to the controller. The image capturing system is adapted to capture an image having at least one sub-frame and is further adapted to obtain distance information of the object. The processor analyzes the image to determine a brightness value of at least a portion of the image and analyzes the distance information of the object to determine a distance value from the imaging assembly to the object. The processor further determines an illumination characteristic based on the brightness value and the distance value.

17 Claims, 6 Drawing Sheets

SYSTEMS AND APPROACHES FOR REDUCING POWER CONSUMPTION IN INDUSTRIAL DIGITAL BARCODE SCANNERS

BACKGROUND OF THE INVENTION

Barcode and other scanning devices generally capture images within a given field of view (FOV). In some instances, handheld devices may be used to capture images of objects positioned at substantial distances from the device and may be in poorly-lit environments. In such environments, handheld devices may be equipped with illumination systems to assist with capturing a suitable image of the object. Such illumination systems can consume substantial amounts of power, and thus can require large battery packs or charging systems for proper operation. As an example, some computer-based charging systems can include current-limited components that are incompatible with the illumination systems in existing scanning devices, and as a result, the scanning device may receive an inadequate power supply. Further, using these illumination systems can reduce the overall number of available images that can be captured prior to needing to recharge the device.

Accordingly, there is a need for improved systems, methods, and devices which address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
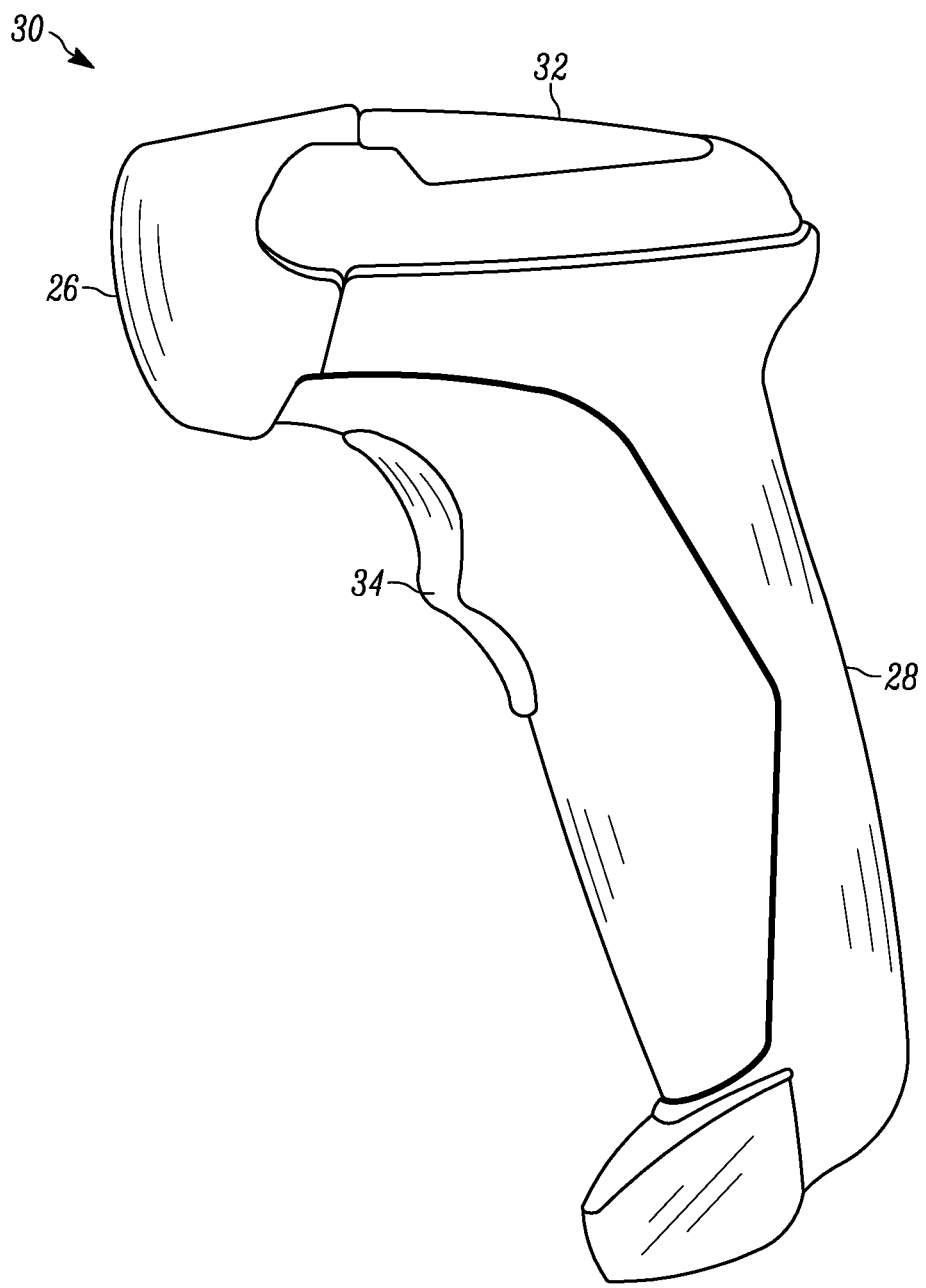
FIG. 1 is a side elevation view of a portable, handheld imaging reader operative for determining a target distance for use in selecting an illumination level in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an embodiment, the present application provides an imaging assembly for capturing at least one object appearing in a field of view (FOV) that includes an image capturing system, a controller operatively coupled to the image capturing system to control operation thereof, and a processor operatively coupled to the controller. The image capturing system is adapted to capture an image having at least one sub-frame and is further adapted to obtain distance information of the object. The processor analyzes the image to determine a brightness value of at least a portion of the image and analyzes the distance information of the object to determine a distance value from the imaging assembly to the object. The processor further determines an illumination characteristic based on the brightness value and the distance value. In some approaches, the controller and the processor may be co-located in an application-specific integrated circuit ("ASIC"). Other examples are possible. Further, in some approaches, the imaging assembly may also include an aiming assembly operatively coupled to the controller.

In some approaches, the illumination characteristic may include a number of illumination levels. For example, the illumination characteristic may be in the form of four illumination levels. The imaging assembly may also include an illumination assembly that is operably coupled to the controller. The illumination assembly is configured to illuminate according to the illumination characteristic. In some examples, the brightness value is derived from at least one of an average brightness of the at least one sub-frame or an overall brightness of the image.

In some aspects, the distance information of the object may be obtained using the captured image, for example by calculating a distance to the sub-frame. In some forms, the image capturing system may include a range-finding assembly operably coupled to the controller that is configured to obtain the distance information.

In another implementation, the present disclosure includes a method of selectively controlling an illumination system of an imaging assembly for capturing at least one object appearing in a FOV. The method includes capturing, via an image capturing system, an image having at least one sub-frame and obtaining distance information of the object. Using a processor, the method analyzes the image to determine a brightness value of at least a portion of the image. Further, using the processor, the method analyzes the distance information of the object to determine a distance value from the imaging assembly to the object. The processor additionally determines an illumination characteristic based on the brightness value and the distance value and activates the illumination system according to the illumination characteristic.

In yet another implementation, an imaging assembly for capturing at least one image of an object appearing in a FOV that includes an image capturing system, a processor, an illumination system, and a controller coupled to the image capturing system, the processor, and the illumination system. The controller is adapted to cause the image capturing system to capture an image having at least one sub-frame and obtain distance information of the object. The controller further causes the processor to analyze the image to determine a brightness value of at least a portion of the image, analyze the distance information of the object to determine a distance value from the imaging assembly to the object, and determine an illumination characteristic based on the brightness value and the distance value. The controller is further adapted to activate the illumination system according to the illumination characteristic.

Turning to the figures, reference numeral 30 in FIG. 1 generally identifies an imaging reader configured as a gun-shaped housing having an upper barrel or body 32 and a lower handle 28 positioned rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets or objects, especially bar code symbols, to be read in an extended range of working distances, for example, on the order of thirty to fifty feet, away from the window 26. Housings of other configurations, as well as readers operated in the hands-free mode, could also be employed.

Figure 2:
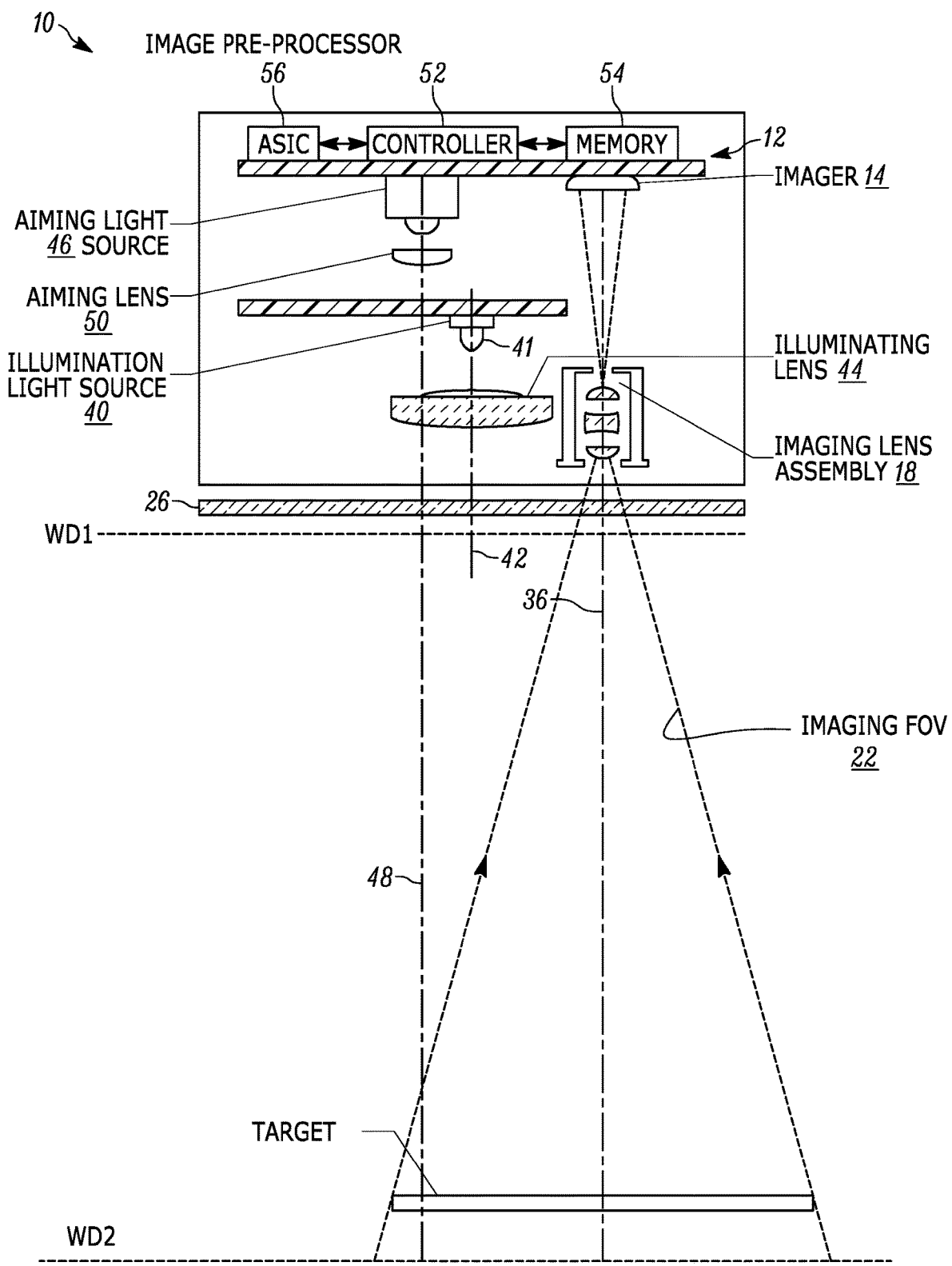
FIG. 2 is a schematic diagram of various components, including imaging, illuminating, and aiming light assemblies supported on an imaging module that is mounted inside the reader of FIG. 1.

As schematically shown in FIG. 2, and as more realistically shown in FIG. 3, an imaging assembly or module 10 is mounted in the reader 30 behind the window 26 and is operative, as described below, for reading targets by image capture through the window 26 over an extended range of working distances away from the assembly 10. An object may be located anywhere in a working range of distances between a close-in working distance (WD1) and a far-out working distance (WD2). In a preferred embodiment, WD1 is either at or about five inches away, from the window 26, and WD2 is substantially further away, for example, over about 300 inches away from the window 26.

The assembly 10 includes an imaging capturing system 12 that has an imaging sensor or imager 14 and an imaging lens assembly 18 for capturing return light over a generally rectangular imaging field of view 22, e.g., between about ten degrees and about thirty degrees, from a target located at any region of the range, e.g., from about zero inches to about 300 inches away from the window 26, and for projecting the captured return light onto the imager 14. Although only a single imager 14 and imaging lens assembly 18 is illustrated in FIG. 2, it will be understood that any number of imagers and imaging lens assemblies could be provided in the assembly 10.

The imager 14 is a solid-state device, for example, a CCD or a CMOS imager having an array of addressable image sensors or pixels arranged in a single, linear row, or preferably a two-dimensional array of such sensors arranged in mutually orthogonal rows and columns, and operative for detecting return light captured by the imaging lens assembly 18 along the imaging axis 36 through the window 26. In some examples, the imaging lens assembly is advantageously a Cooke triplet. The imaging lens assembly 18 may have a fixed or a variable focus by implementing a variable focus element and/or a movable lens assembly (not shown).

Figure 3:
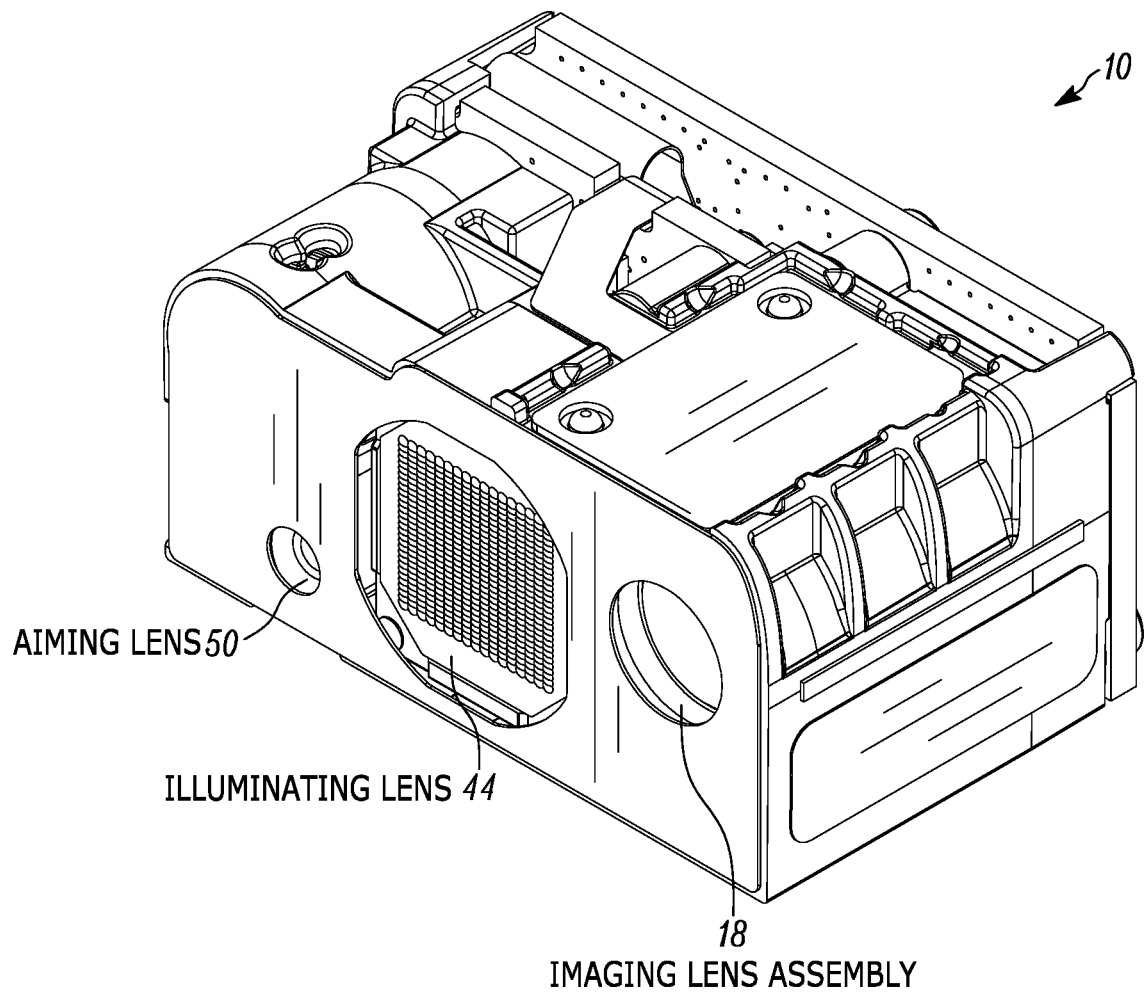
FIG. 3 is a perspective view of the imaging module of FIG. 2 in isolation.

As also shown in FIGS. 2 and 3, an illumination assembly 40 is also supported by the imaging assembly 10 and includes an illumination light source, e.g., at least one light emitting diode (LED) 41, stationarily mounted on an optical axis 42, and an illuminating lens assembly that includes an illuminating lens 44 also centered on the optical axis 42. As will be discussed, the illumination assembly 40 is operative for emitting illumination light at varying illumination levels.

As further shown in FIGS. 2 and 3, an aiming light assembly is also supported by the imaging assembly 10 and includes an aiming light source 46, e.g., a laser, stationarily mounted on an aiming axis 48, and an aiming lens 50 centered on the aiming axis 48. The aiming lens 50 may include a diffractive or a refractive optical element, and is operative for projecting a visible aiming light pattern along the aiming axis 48 on the target prior to reading. In some examples, the aiming light pattern includes an aiming light spot, preferably of generally circular shape. The aiming light assembly may function as a rangefinder to assist in determining a working distance from the device 10 to the object.

As further shown in FIG. 2, the image capturing system 12, the imager 14, the LED 41, and the laser 46 are operatively connected to a controller or programmed microprocessor 52 operative for controlling the operation of these components. A memory 54 is connected and accessible to the controller 52. Preferably, the controller 52 is the same as the one used for processing the return light from the targets and for decoding the captured target images. An image pre-processor 56 is also operatively coupled to the controller 52, and in some examples, may be arranged in a custom application-specific integrated circuit (ASIC) or a field-programmable gate array (FPGA) that is operatively connected between the imager 14 and the controller 52 for pre-processing the images captured by the imager 14, as described more fully below. The image pre-processor 56 may, in some applications, be integrated with the controller 52.

As described above, providing illumination for capturing an image of the object that can be located anywhere in the extended working distance range can consume large amounts of power. One aspect of this disclosure is directed to enhancing reader performance by selectively operating the illumination assembly such that different levels of illumination are provided depending on any number and/or combination of factors. For example, the imaging reader 30 may ascertain the distance from the reader 30 to the target, and combine this information with a brightness value to determine an appropriate illumination level. The aiming assembly may function as a rangefinder to determine the distance to the target, and the pre-processor 56 and/or the controller 52 may function by selecting the correct illumination from the LED 41 based on the determined distance.

Figure 4:
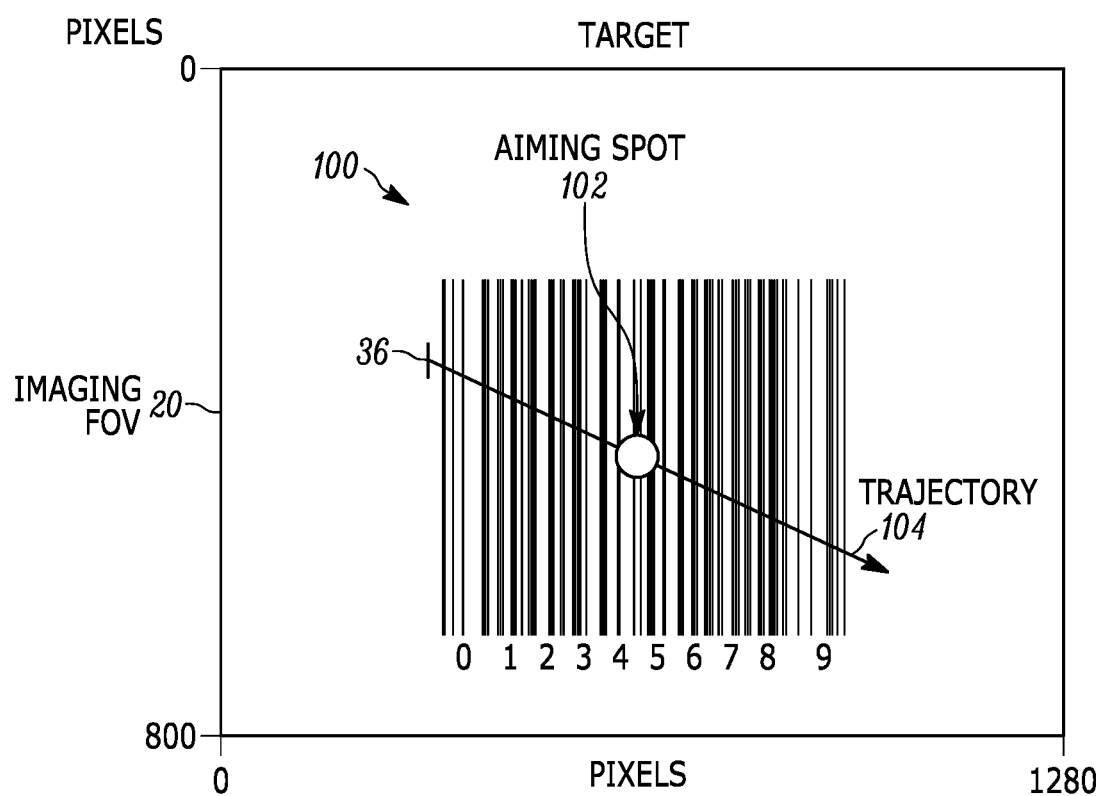
FIG. 4 is a view of an image having a sub-frame during a determination of the target distance and a suitable illumination level of the reader to capture the image.
Figure 5:
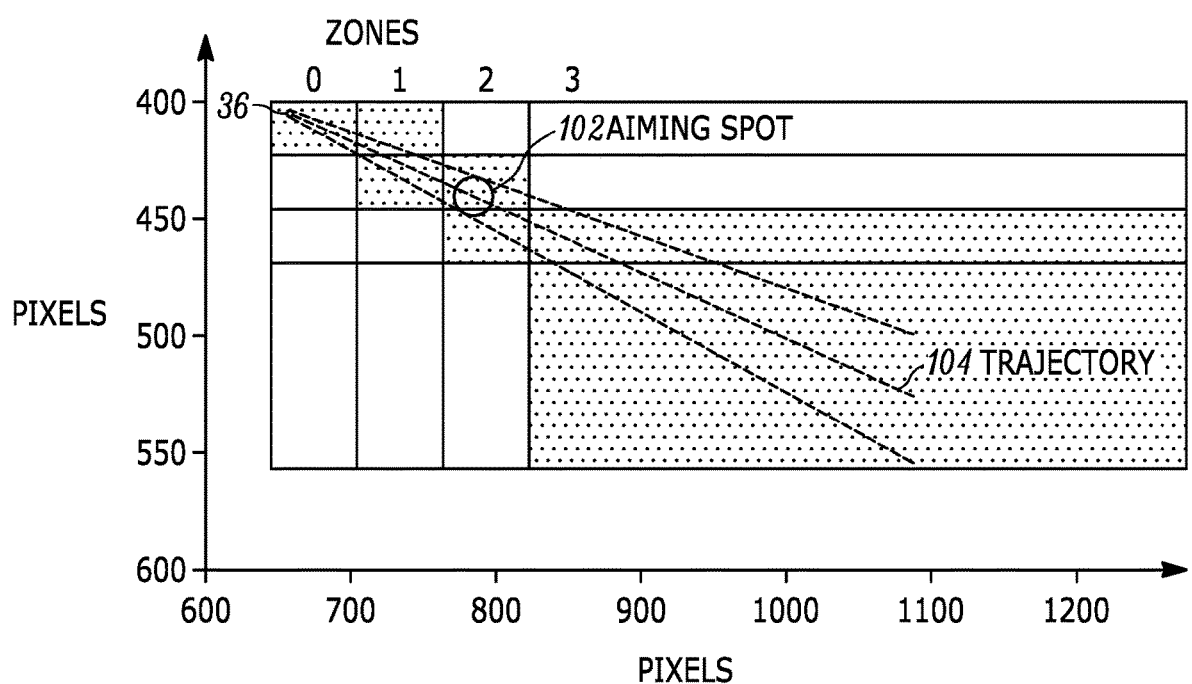
FIG. 5 is a view of an image containing the aiming spot during a determination of the position of the aiming spot in the image.
Figure 6:
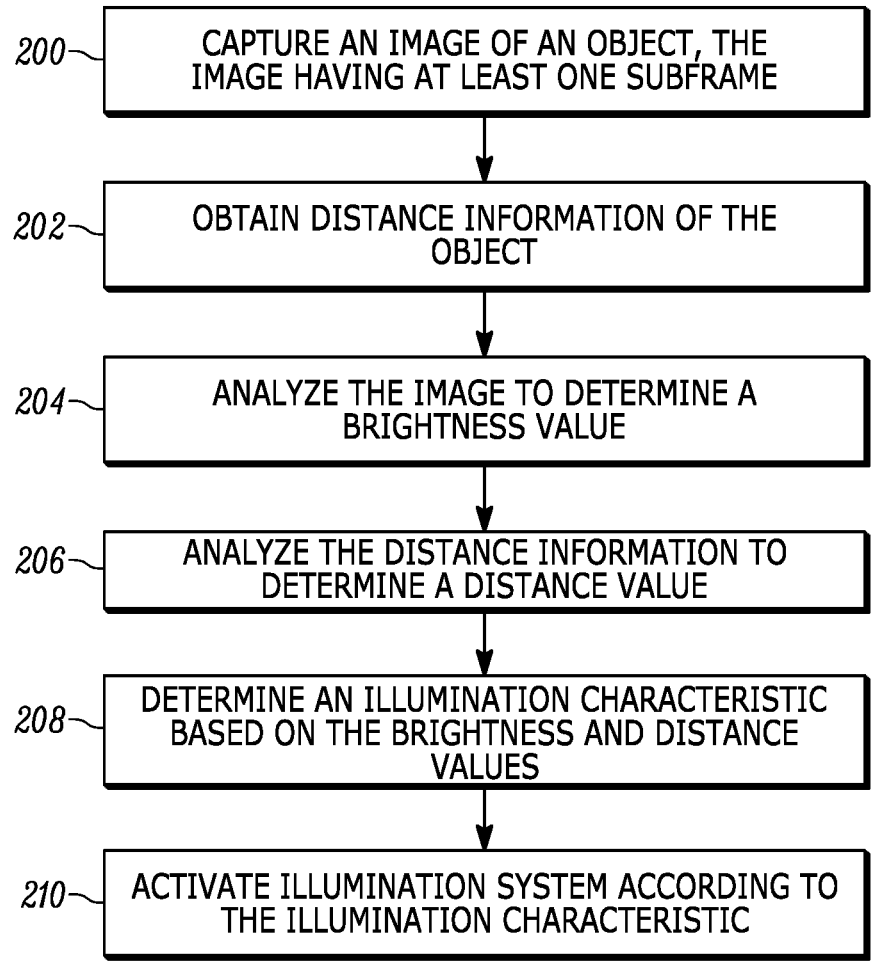
FIG. 6 is a flow chart depicting steps performed in a method of selectively controlling an illumination system of an imaging assembly for capturing at least one image of an object appearing in a field of view in accordance with this disclosure.

As shown in FIG. 4, an object or target configured as a symbol 100 located in the range is contained in the field of view 20 of the imager 14, and preferably the imaging axis 36 is approximately centered in the field of view 20. By determining the position of the aiming spot 102 relative to the imaging axis 36 on the trajectory 104 in the image, the working distance of the symbol 100 can be determined. The spacing between the aiming spot 102 and the imaging axis 36 is proportional to the reciprocal of the working distance. Preferably, the position of the aiming spot 102 along the trajectory 104 is calibrated in advance during reader manufacture. As also shown in FIGS. 5-6, the imager 14 captures images of the symbol 100 at a certain resolution, in this illustrated case, a two-dimensional resolution of 800 rows of pixels in height by 1280 columns of pixels in width, however other examples are possible.

The image pre-processor 56 is used to analyze the images captured by the imager 14 in order to determine the position of the aiming spot 102, which in turn is used to determine the distance to the target object. Further, the image pre-processor 56 is used to analyze the images captured by the imager 14 in order to ascertain a brightness value of the object. The brightness value and the distance to the target object information are then used to determine an appropriate illumination level. To minimize cost, in some examples, the image pre-processor 56 is preferably incorporated in a low power, low processing device, preferably without a frame buffer to store images. As a result, as explained below, the image pre-processor 56 is not tasked with analyzing each entire captured image, but instead, only analyzes a fractional region of each captured image, especially the fractional region in which the aiming spot 102 is expected to appear along the trajectory 104. However, it is appreciated that in other examples, the pre-processor 56 may be configured to analyze a more substantial and/or entire region of the captured image.

More particularly, the controller 52 energizes the aiming laser 46 to direct the aiming spot 102 on the symbol 100. The imager 14 captures a first, entire or preferably partial, image of the symbol 100 with the aiming spot 102 thereon in a first frame. In response, the image pre-processor 56 may only analyze a fractional region of the first image in the first frame. As shown in FIG. 5, the image pre-processor 56 does not analyze the pixels in row 0 to approximately row 400, or the pixels in about row 560 to row 800, or the pixels in column 0 to about column 640, because the pre-processor 56 approximates the location of the aiming spot 102 thereby avoiding wasting processing power or time in analyzing pixels where the aiming spot 102 will not be present. The fractional region or remaining area contains only about 160 rows of the original 800 rows of the full first image, and can thus be captured and analyzed faster than the full first image.

The image pre-processor 56 subdivides the remaining area of the first frame into a matrix of sub-frames or coarse zones. As shown in FIG. 5, the remaining area is subdivided into sixteen, generally rectangular sub-frames, e.g., four rows by four columns. The sub-frames need not be of equal height, or width, or area. It will be understood that the remaining area could be subdivided into any number of sub-frames. The number of the sub-frames is dependent on the precision desired in initially locating the aiming spot 102 in the sub-frames.

The image pre-processor 56 next acquires image data from each of the sub-frames. More particularly, the tonal or brightness values of all the pixels in each sub-frame are averaged to obtain an average brightness value. The image pre-processor 56 obtains a matrix of sixteen average brightness values, one for each sub-frame.

Thereupon, the controller 52 deenergizes the aiming laser 46, and the imager 14 captures a second, entire or preferably partial, image of the symbol 100 without the aiming spot 102 thereon in a second frame. As before, the image pre-processor 56 only analyzes a fractional region of the second image in the second frame, and it is the same fractional region as was used in the first image. As before, the image pre-processor 56 acquires brightness values of all the pixels in each sub-frame of the same fractional region, averages the brightness values in each sub-frame of the same fractional region to obtain average brightness values, and obtains a matrix of sixteen average brightness values, one for each sub-frame.

By way of a non-limiting numerical example, the matrix of the sixteen average brightness values with the aiming assembly deenergized is shown below:

| Aim_Off= | 7.729 | 10.501 | 5.965 | 21.158 |
|---|---|---|---|---|
| | 7.214 | 7.715 | 5.841 | 20.854 |
| | 5.74 | 8.623 | 6.118 | 16.34 |
| | 11.012 | 7.696 | 4.729 | 6.908 |

The matrix of the sixteen average brightness values with the aiming assembly energized is shown below:

| Aim_On= | 8.482 | 10.672 | 5.939 | 21.283 |
|---|---|---|---|---|
| | 7.4 | 7.693 | 5.847 | 20.791 |
| | 5.758 | 8.602 | 6.092 | 16.263 |
| | 11.01 | 7.587 | 4.638 | 6.814 |

The image pre-processor 56 next compares the two matrices by subtracting the average brightness value for each sub-frame, thereby obtaining, in this numerical example, the following difference matrix of brightness difference values:

| Aim_On – Aim_Off= | 0.753 | 0.171 | −0.026 | 0.125 |
|---|---|---|---|---|
| | 0.186 | −0.022 | 0.006 | −0.063 |
| | 0.018 | −0.021 | −0.026 | −0.077 |
| | −0.002 | −0.109 | −0.091 | −0.094 |

It will be observed from the difference matrix that the brightness difference value in row 1, column 1, stands out from all the others, in that it has the greatest magnitude or difference in brightness. This identifies the location of the aiming spot 102. If more precision in determining the location of the aiming spot 102 is desired, then the image pre-processor 56 can subdivide an area around the identified location of the aiming spot 102 into a plurality of sub-regions. For example, U.S. Pat. No. 9,800,749, issued on Oct. 24, 2017, describes such an approach, the contents of which are incorporated herein by reference in their entirety.

In some examples, not all sixteen sub-frames need to be analyzed, since the aiming spot 102 will only appear in the shaded sub-frames that lie along the trajectory 104. This reduces the possibility of errors resulting from moving objects or flashing light sources that might appear only in the image with the aiming laser 46 energized, and be mistaken for the aiming spot 102.

In operation, once the working distance to the symbol 100 is determined from the aiming spot position, the controller 52 and/or pre-processor 56 uses average brightness information from one or both of the captured images of the symbol 100 to calculate a brightness value. Any number of sub-frames may be used to derive the brightness value, which may be in the form of a count of "data numbers" present in the image. In a preferred embodiment, the captured image lacking the aiming spot 102 is used to ensure an accurate brightness value is obtained. It is appreciated that in some examples, the sub-frame capture, the brightness value determination, and working distance calculation steps occur at approximately the same time so as to improve performance of the assembly 10.

Upon determining the distance value and brightness value of all or a portion of the captured image, the pre-processor determines an illumination characteristic based on these values. The illumination characteristic may be in the form of any number of illumination levels, such as, for example, a first illumination level where the LED 41 is not energized or activated, a second illumination level corresponding to a "low" brightness or intensity, a third illumination level corresponding to a "medium" brightness or intensity, a fourth illumination level corresponding to a "high" brightness or intensity, and/or any number of additional illumination levels. The controller 52 then causes the LED 41 to be energized at the proper illumination level, and additionally causes the image capturing system 12 to capture an image having appropriate illumination for further analysis.

In some forms, these illumination levels are obtained by adjusting the current provided to the LED 41. The following look-up table provides an example matrix of scene brightness as decoded by DN quantities at varying distances to the object:

| Ranging distances (inches) | 0-18 | 18-60 | 60+ |
|---|---|---|---|
| Normalized mean in zones | 15 < DN < 35 (e.g., bright area of warehouse, 25 to 50 fcd ambient measurement, assuming image is ⅔ white) | | |
| Illumination current | 0 | 0 | 0 |
| Normalized mean in zones | 8 < DN < 15 (e.g., in-between ambient) | | |
| Illumination current | 15 | 70 | 300 |
| Normalized mean in zones | DN < 8 (e.g., dark area of warehouse, <12 fcd ambient measurement, assuming image is ⅔ white) | | |
| Illumination current | 30 | 150 | 600 |

Accordingly, in some examples, when the pre-processor 56 determines the average brightness of the image represents a bright or well-lit environment, the LED 41 will not be used regardless of the distance to the object because it is not needed to adequately capture and analyze the image. In the example look-up table, the provided illumination currents correspond to a total of seven different illumination levels. Other numbers of suitable illumination levels are possible.

It is understood that in some forms, a range-finder that is coupled to the controller 52 and/or the pre-processor 56 may be used in place of or in conjunction with the aimer system. For example, the range-finder may emit a laser pulse, a sound wave, or may use any other sensing device that measures the time required for the emission to return to the device in order to calculate a distance value. Other examples are possible.

As shown in the flow chart of FIG. 6, the method is performed in step 200 by capturing an image of an object or symbol 100 with the image capturing system 12, whereby the image has at least one sub-frame, by obtaining distance information of the symbol 100 in step 202, and by using the pre-processor 56 to analyze the image to determine a brightness value in step 204. Next, the pre-processor 56 analyzes the distance information to determine a distance value in step 206 and determines an illumination characteristic based on the brightness and distance values in step 208. In step 210, the illumination system or assembly 40 is activated according to the illumination characteristic.

So configured, the described imaging assembly 10 uses less power than conventional systems which only provide distance-based illumination systems. In some examples, the described imaging assembly 10 may consume between approximately 5% and 50% less energy than conventional systems, thereby prolonging the usable life of the device before requiring charging. Other examples of reduced power consumption are possible.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. An imaging assembly for capturing at least one image of an object appearing in a field of view (FOV), the imaging assembly comprising:
   an image capturing system adapted to capture an image having at least one sub-frame, the image capturing system further adapted to obtain distance information of the object;
   an illumination assembly configured to illuminate the FOV;
   a controller operatively coupled to the image capturing system and the illumination assembly to control operation thereof; and
   a processor operatively coupled to the controller to:
      analyze the image to determine a brightness value of at least a portion of the image,
      analyze the distance information of the object to determine a distance value from the imaging assembly to the object,
      determine an illumination characteristic based on the brightness value and the distance value, and
      simultaneously control (i) the illumination assembly to illuminate the FOV according to the illumination characteristic and (ii) the image capturing system to capture a further image.

2. The imaging assembly of claim 1, wherein the illumination characteristic comprises a plurality of illumination levels.

3. The imaging assembly of claim 1, wherein the brightness value is derived from at least one of an average brightness of the at least one sub-frame or an overall brightness value of the image.

4. The imaging assembly of claim 1, wherein the distance information of the object is obtained using the captured image.

5. The imaging assembly of claim 4, wherein the distance information of the object is obtained by calculating a distance to the at least one sub-frame.

6. The imaging assembly of claim 1, wherein the image capturing system further comprises a range-finding assembly operably coupled to the controller, the range-finding assembly configured to obtain the distance information of the object.

7. The imaging assembly of claim 1, further comprising an aiming assembly operatively coupled to the controller.

8. A method of selectively controlling an illumination system of an imaging assembly for capturing at least one image of an object appearing in a field of view (FOV), the method comprising:
   capturing, via an image capturing system, an image having at least one sub-frame;
   obtaining distance information of the object;
   analyzing, using a processor, the image to determine a brightness value of at least a portion of the image;
   analyzing, using the processor, the distance information of the object to determine a distance value from the imaging assembly to the object;
   determining, using the processor, an illumination characteristic based on the brightness value and the distance value;
   activating the illumination system to illuminate the FOV according to the illumination characteristic; and
   simultaneously with the activating, controlling the image capturing system to capture a further image.

9. The method of claim 8, wherein the activating is performed by illuminating the illumination assembly according to at least one of a plurality of illumination levels.

10. The method of claim 8, wherein the brightness value is determined from at least one of an average brightness of the at least one sub-frame or an overall brightness value of the image.

11. The method of claim 8, wherein the captured image is used to obtain the distance information.

12. The method of claim 8, wherein the obtaining is performed using a rangefinder operably coupled to the imaging assembly.

13. An imaging assembly for capturing at least one image of an object appearing in a field of view (FOV), the imaging assembly comprising:
   an image capturing system;
   a processor;
   an illumination system configured to illuminate the FOV; and
   a controller coupled to the image capturing system, the processor, and the illumination system, the controller adapted to:
      cause the image capturing system to capture an image having at least one sub-frame,
      obtain distance information of the object,
      cause the processor to analyze the image to determine a brightness value of at least a portion of the image, analyze the distance information of the object to determine a distance value from the imaging assembly to the object, and determine an illumination characteristic based on the brightness value and the distance value,
      activate the illumination system to illuminate the FOV according to the illumination characteristic, and
      simultaneously with the activation, control the image capturing system to capture a further image.

14. The imaging assembly of claim 13, wherein the controller activates the illumination system at at least one of a plurality of illumination levels.

15. The imaging assembly of claim 13, wherein the brightness value is derived from at least one of an average brightness of the at least one sub-frame or an overall brightness value of the image.

16. The imaging assembly of claim 13, wherein the distance information of the object is obtained using the captured image.

17. The imaging assembly of claim 13, further comprising a range-finding assembly operably coupled to the controller, the controller further being adapted to cause the range-finding assembly to obtain the distance information of the object.

* * * * *